United States Patent Office 2,920,057

Patented Jan. 5, 1960

2,920,057

PUTTY COMPRISING THE REACTION PRODUCT OF A QUATERNIZING AGENT AND A CONJUGATED DIENE - HETEROCYCLIC NITROGEN BASE COPOLYMER

James E. Pritchard, Bartlesville, Okla., assignor to Phillips Petroleum Company, a corporation of Delaware No Drawing. Application June 5, 1953
Serial No. 359,959

20 Claims. (Cl. 260—41.5)

This invention relates to putty. In a further aspect, this invention relates to plastic, spreadable putty compositions. In a further aspect, this invention relates to oil resistant putty compositions, these compositions being prepared from quaternizing agents and copolymers of conjugated dienes and polymerizable vinylidene-substituted heterocyclic nitrogen bases.

Putty compositions or sealants which can be converted to rubbery, oil resistant solids under mild conditions of cure, are of interest where products are desired which have joints or seams therein, which, of necessity, must be water-tight, gas-tight, or resistant to hydrocarbon solvents.

A particularly important and exacting application for sealants of this type is found in the aircraft industry, where efficient caulking of aluminum seams is required in the fabrication of fuel cells or bunkers. Such sealants are used along the seams joining the aluminum sheet stock and in the holes where rivets are to be placed. Sealants used in such applications must be flexible over a wide temperature range, resistant to hydrocarbon solvents, and capable of being easily applied. Such sealants can also be used for the glass to metal seal in the windows of aircraft.

One class of materials which has been used in this manner comprises rubbery polysulfide polymers. However, such polymers, while being generally satisfactory, have some serious drawbacks, which have brought about a search for materials which can be substituted therefor. Such polysulfide rubbers have bubbles of entrapped air or water therein which are formed within the putty during the curing reaction. Furthermore, the stress-strain values of such putties are relatively poor. Although such rubbers have excellent resistance to swelling when in contact with hydrocarbon solvents, they are relatively weak as far as tensile strength is concerned when they are wet with such solvents. Because of this low tensile strength, the bubbles of entrapped air or water have a tendency to expand and rupture under the reduced pressure conditions encountered at high altitudes. When this rupture occurs, there is a danger that the resulting porous structure will permit the loss of fuel, with its resulting dangers.

I have discovered a material which is satisfactory for use as a putty composition which does not have the drawbacks of these polysulfide rubbers. It has flow characteristics which permit application to a solid surface by means of a knife or caulking gun. Also, it exhibits good adhesion to surfaces of metal, wood, glass, and the like, even when immersed in a solvent, e.g., a hydrocarbon oil and it is creep resistant so that undesirable flow or creep is minimized when the material is applied to vertical surfaces. By control of the compounding ingredients, it is possible to prepare compositions of any desired consistency for application as well as to control the length of time necessary for the setting up of the composition. Finally, these compositions do not dry out and crack with age or show appreciable shrinkage, but, on the other hand, remain somewhat flexible and have a long useful life.

Each of the following objects is obtained by at least one of the aspects of this invention.

An object of this invention is to prepare a new putty. A further object of this invention is to prepare an oil-resistant putty, this composition being derived from copolymers of conjungated dienes and polymerizable vinylidene-substituted heterocylic nitrogen bases. A further object of this invention is to provide putty prepared from quaternized copolymers of polymerizable vinylidene-substituted heterocyclic nitrogen bases. A further object of this invention is to provide a putty prepared by reacting a quaternizing agent having an equivalent weight of at least 150 with the copolymers above described. A further object of this invention is to provide a putty prepared by quaternizing a copolymer of a conjugated diene and a heterocyclic nitrogen base of the quinoline or pyridine series. A further object of this invention is to provide a putty prepared from butadiene, 2-methyl-5-vinylpyridine, and a suitable quaternizing agent. A further object of this invention is to provide the ingredients of a putty composition in a manner for sale to the ultimate consumer.

Other objects and advantages of my invention will be apparent to one skilled in the art upon reading the accompanying disclosure.

This application is a continuation-in-part of my copending application Serial No. 284,448, filed April 25, 1952, now abandoned, which relates broadly to the production of solid materials from liquid or solid copolymers of conjugated dienes with these polymerizable heterocyclic nitrogen bases. A wide variety of quaternizing agents is set forth in that application and the mechanism of the quaternization reaction is set forth in detail.

I have now found that copolymers of conjugated dienes with polymerizable heterocyclic nitrogen bases containing an active vinylidene group ($CH_2=C<$), particularly those of the pyridine an quinoline series, are satisfactory for the production of oil resistant sealing compositions or fillers, such as putty and the like. These copolymers, when mixed with a quaternizing agent and such other materials as are desired to give the composition suitable properties, have the proper consistency for spreading or extrusion and can be cured satisfactorily to give products which are flexible and rubbery or hard depending upon the copolymer, the quaternizing agent, and the types and amounts of compounding materials employed.

The polymeric materials which are applicable are those described in the copending application of Pritchard, Serial No. 284,448, filed April 25, 1952. These copolymers range from liquid to rubbery materials and, in their preparation, the conjugated diene component is in the range from 2 to 98 parts by weight per 100 parts of monomers with the amount of copolymerizable heterocyclic nitrogen base being in the range from 98 to 2 parts by weight per hundred parts of monomers. It is essential that sufficient conjugated diene be employed so that the copolymer is vulcanizable and that sufficient copolymerizable heterocyclic nitrogen base be present so that after the quaternizing reaction has occurred, as well as other reactions during vulcanization, the final product will have suitable properties. The heterocyclic nitrogen bases, including the alkyl substituted bases, which are applicable in the practice of my invention are those which are copolymerizable with a conjugated diene and include the $$CH_2=\overset{\displaystyle R}{\overset{|}{C}}-$$

substituted nitrogen bases wherein R is a hydrogen or a hydrocarbyl (containing only carbon and hydrogen atoms)

group such as an alkyl group. The vinyl-substituted heterocyclic nitrogen bases of the pyridine and quinoline series having only one vinyl substituent group as well as their various alkyl substituted derivatives are preferred. The total number of carbon atoms in the nuclear substituted alkyl groups attached to any pyridine or quinoline derivative preferably should be not greater than 12. In addition to vinyl-substituted pyridines and vinyl-substituted quinolines, the isopropenyl substituted (i.e. a vinyl group having a methyl substituent in the alpha position) pyridines and quinolines are useful.

It is to be understood that mixtures of various conjugated dienes and mixtures of various copolymerizable heterocyclic nitrogen bases can be employed in the practice of this invention together with, if desired, up to about 50 percent by weight, preferably between 5 and 30 percent by weight, of the total monomeric material, of other copolymerizable materials such as acrylonitrile, styrene, vinyl chloride, methyl acrylate, methyl methacrylate, vinyl acetate, methyl vinyl ether, methyl isopropenyl ketone, and the like. The quaternization reaction is described in the above mentioned application and considerations for the selection of quaternizing agents are set forth. Quaternizing agents applicable for use in the present invention are those which have an equivalent weight of at least 150, the range between 175 and 500 being most preferable. The most commonly used quaternizing agents are those containing a halogen or a sulfate group. Illustrative compounds include the following: propyl iodide, hexyl iodide, cetyl iodide, octene iodide, acetyl iodide, propionyl chloride, benzoyl bromide, ethyl bromoacetate, amyl chloroacetate, diethyl bromosuccinate, diethyl monobromomalonate, diethyl alpha-chloroadipate, diethyl alpha-chlorobutyrate, 3-iodo-1-butene, 3-bromo-1-hexene, 5-bromo-3-octene, 3-chloro-3,4-dimethyl-1-pentene, 3-chloro-3-ethyl-1-pentene, 3-chloro-3-ethyl-1-hexene, 4-chloro-3-ethyl-2-hexene, 3,4-diodo-2-hexene, alpha-iodoethyl ethyl ether, chloromethyl phenyl ether, alpha-iodobenzyl benzyl ether, decyl sulfate, cetyl sulfate, dodecyl sulfate, benzyl sulfate, benzyl chloride, methyl benzenesulfonate, methyl paratoluenesulfonate and the like.

It is preferable to use active quaternizing agents because of the low temperatures employed in the curing of these putty compositions. Preferably the curing temperature is below 100° C., although high pressure steam can be used. Temperatures up to 250° C. are sometimes used. There is some slight tendency to creep where higher temperatures are used and it is frequently desirable to carry out the quaternization at lower temperatures to avoid this tendency.

Various pigments, fillers, and/or reinforcing agents can be employed as desired. Examples of these materials include carbon black, titanium dioxide, whiting, talc, and clays. The amount of pigment, filler, or reinforcing agent can vary in the range between 0 and 500 parts per 100 parts of polymer. While it is generally preferred that some reinforcing agent or filler be present, in some instances the quaternized polymer will be sufficiently strong and have other properties which are desirable without the presence of these additional materials. Where it is desired to have the compound cure at low temperatures, highly active vulcanization accelerators are employed. Because of the convenience of application, these self curing compositions are particularly valuable.

Examples of such vulcanization accelerators are "Butyl-8," a dithiocarbamate rubber accelerator; "Du Pont 552," piperidinium pentamethylene-dithiocarbamate; and "Ultex," an organic salt of dithiocarbamic acid. A vulcanization system which gives good results comprises dibenzylamine and zinc butyl xanthate.

The following examples illustrate compositions prepared according to this invention, but should be considered as illustrative and not as limiting this invention.

EXAMPLE I

A 70/30 butadiene/2-methyl-5-vinylpyridine copolymer having a Mooney value (ML-4) of about 20 was prepared by emulsion polymerization at 50° C. in accordance with the following recipe:

| | Parts by weight |
|---|---|
| Butadiene | 70 |
| 2-methyl-5-vinylpyridine | 30 |
| Water | 180 |
| Fatty acid soap | 5 |
| Mercaptan blend [1] | 0.4 |
| $K_2S_2O_8$ | 0.3 |

[1] A blend of tertiary $C_{12}$, $C_{14}$, and $C_{16}$ aliphatic mercaptans in a ratio of 3:1:1 parts by weight.

The following composition was prepared using the above-described butadiene/2-methyl-5-vinylpyridine copolymer:

| | Parts by weight |
|---|---|
| Copolymer | 100 |
| Diethyl monobromomalonate | 60 |
| Carbon black (Philblack A) | 80 |
| Butyl-8 [1] | 5 |
| Zinc oxide | 5 |
| Stearic acid | 1.5 |
| Sulfur | 3 |

[1] A dithiocarbamate-type rubber accelerator.

The composition had the consistency of a paste, was easy to spread, and had good extrusion characteristics. It showed excellent adhesion to metal surfaces after being applied and allowed to cure at about 25° C. A sample cured 108 hours at about 25° C. had a tensile strength of 1430 p.s.i. and an elongation of 350 percent. It also showed good low temperature flexibility. When a sample was immersed in a 70/30 isooctane-toluene mixture for 48 hours at 25° C., it showed 42 percent swell and 14 percent extractability.

EXAMPLE II

A sample of the 73/30 butadiene/2-methyl-5-vinylpyridine copolymer prepared in Example I was employed in the preparation of the following composition:

| | Parts by weight |
|---|---|
| Copolymer | 100 |
| Stearic acid | 1 |
| Zinc oxide | 5 |
| Carbon black (Philblack A) | 80 |
| Sulfur | 2 |
| Zinc dibutyl dithiocarbamate | 2 |
| Dibenzylamine | 2 |
| Zinc butyl xanthate | 2 |
| Diethyl monobromomalonate | 60 |

The material had similar consistency, spreading, extrusion, and adhesion properties to the composition of Example I. A sample cured 108 hours at 25° C. had a tensile strength of 1480 p.s.i. When immersed in a 70/30 isooctane-toluene mixture at 25° C. for 48 hours, the sample showed 79 percent swell and 14 percent extractability.

EXAMPLE III

A 75/25 butadiene/2-methyl-5-vinylpyridine liquid copolymer was prepared by emulsion polymerization at 50° C. using the recipe of Example I except for the quantity of mercaptan blend which was 5 parts. This copolymer was employed in the preparation of the following composition:

| | Parts by weight |
|---|---|
| Copolymer | 100 |
| Diethyl monobromomalonate | 40 |
| Butyl-8 [1] | 5 |
| Zinc oxide | 5 |
| Stearic acid | 1.5 |
| Sulfur | 3 |
| Titanium dioxide | 150 |

[1] As in Example I.

The composition had the consistency of a paste, was easy to spread, and had good extrusion characteristics. It showed good adhesion to metal surfaces after being applied and allowed to cure at about 25° C. When cured under the same conditions as in the preceding examples, it had a tensile strength of 172 p.s.i. After immersion in a 70/30 isooctane-toluene mixture for 48 hours at 25° C., it showed 91 percent swell and 15 percent extractability.

EXAMPLE IV

A 50/50 butadiene/2-methyl-5-vinylpyridine liquid copolymer was prepared by emulsion polymerization at 50° C. using the recipe of Example I except for the quantity of mercaptan blend which was 5 parts. This copolymer was employed in the preparation of the following composition:

| | Parts by weight |
|---|---|
| Copolymer | 100 |
| Diethyl monobromomalonate | 100 |
| Butyl-8 [1] | 2 |
| Sulfur | 1.75 |
| Zinc oxide | 5 |
| Titanium dioxide | 400 |

[1] As in Example I.

This material was of good consistency for spreading and extrusion and showed excellent adhesion to metal surfaces after being applied and allowed to cure at 25° C. for 24 hours. The cured composition was hard and oil resistant.

EXAMPLE V

Liquid 75/25 butadiene/2-methyl-5-vinylpyridine copolymer was compounded in the following recipes:

| | Composition #1, Parts by Weight | Composition #2, Parts by Weight |
|---|---|---|
| Copolymer | 100 | 100 |
| Titanium dioxide | 150 | ---------- |
| Carbon black (Philblack A) | ---------- | 75 |
| Diethyl monobromomalonate | 40 | 40 |
| Butyl-8 | 5 | 5 |
| Zinc oxide | 5 | 5 |
| Sulfur | 3 | 3 |
| Stearic acid | 1.5 | 1.5 |

These compositions were cured for 72 hours and 14 days, being tested at both of these times. Tests of this material and a comparison with polysulfide rubber are shown in Table I. The polysulfide rubber was compounded in the following recipe and cured at 25° C.:

| | Parts by weight |
|---|---|
| Polysulfide rubber | 100 |
| Carbon black | 50 |
| Lead dioxide | 7.5 |
| Stearic acid | 1 |

This polysulfide rubber had an average structure of

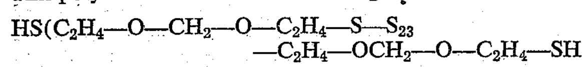

$$HS(C_2H_4—O—CH_2—O—C_2H_4—S—S_{23}—C_2H_4—OCH_2—O—C_2H_4—SH$$

and an average molecular weight of approximately 4000.

*Table I*

| Elastomer | Cure Time | Tensile | Elongation | Shore, A-2 | Percent Swell | Percent Extraction |
|---|---|---|---|---|---|---|
| Composition #1 | 72 Hr | 172 | 150 | -------- | 91 | 15 |
| | 14 days | 450 | 60 | 83 | 54 | 11 |
| Composition #2 | 72 Hr | 415 | 90 | -------- | 68 | 25 |
| | 14 days | 525 | 80 | 91 | 65 | 19 |
| Polysulfide rubber | 36 Hr [1] | 320 | 150 | 75 | 7 | 11 |
| | 108 Hr | 127 | 65 | 76 | 10 | 8 |

[1] 36 hour cure and 108 hour cure from different batches. Poor duplication attributed to mixing difficulties inherent in polysulfide rubber compositions.

EXAMPLE VI

Sealant compositions were prepared according to the following recipes using a 70/30 butadiene/2-methyl-5-vinylpyridine copolymer having a Mooney value (ML-4) of 20:

| | Composition #1, Parts by Weight | Composition #2, Parts by Weight |
|---|---|---|
| Polymer | 100 | 100 |
| Carbon black | 80 | 80 |
| Diethyl bromomalonate | 60 | 60 |
| Butyl-8 | 5 | 5 |
| Zinc oxide | 5 | 5 |
| Sulfur | 3 | 3 |
| Stearic acid | 1.5 | 1.5 |
| Softener | ---------- | 20 |

The softener used was a liquid 75/25 butadiene/2-methyl-5-vinylpyridine copolymer and these compositions were cured at 25° C. and tested at 36 hours and 108 hours. A comparison was made with the polysulfide rubber prepared according to the recipe in Example V. The results are tabulated in Table II.

*Table II*

| Elastomer | Cure Time, Hr. | Tensile | Elongation | Shore A-2 | Percent Swell | Percent Extraction |
|---|---|---|---|---|---|---|
| Composition #1 | 36 | 260 | 500 | -------- | 63 | 17 |
| | 108 | 1,430 | 350 | 84 | 42 | 14 |
| Composition #2 | 36 | -------- | -------- | -------- | 124 | 22 |
| | 108 | 880 | 380 | 75 | 65 | 16 |
| Polysulfide rubber | [1] 36 | 320 | 150 | 75 | 7 | 11 |
| | 108 | 127 | 65 | 76 | 10 | 8 |

[1] 36 hour and 108 hour cures are from different stocks. Poor duplication attributed to mixing difficulties inherent in polysulfide rubber compositions.

EXAMPLE VII

In order to demonstrate the resistance of these oil resistant putties to types of fuel found in aircraft applications, the resistance to a solvent comprising a 30 percent aromatic fuel containing 0.1 percent thiophenol was determined. The copolymer putty was a 70/30 butadiene/2-methyl-5-vinylpyridine copolymer compounded according to the recipe of Example I and the polysulfide rubber was compounded with 50 parts carbon black, 7.5 parts lead oxide, and 1 part stearic acid, all parts being parts by weight based upon 100 parts of the rubber. The properties of these materials are set forth in Table III.

*Table III*

| Sealant | Original Properties | | | Resistance to solvent (after 48 hrs. 25° C.) | | | | |
|---|---|---|---|---|---|---|---|---|
| | Tensile | Elongation | Shore A-2 | Wet Tensile | Wet tion Elonga- | Shore A-2 | Vol. Swell, Percent | Extraction, Percent |
| 70/30 butadiene/2-methyl-5-vinylpyridine copolymer | 1,430 | 350 | 82 | 970 | 220 | 45 | 49 | 6 |
| Polysulfide rubber [1] | 650 | 105 | 83 | [2] 180 | 125 | 54 | 12 | 15 |

[1] Stock cured 48 hours at 25° C., milled on rubber mill and cured 10 minutes at 310° F. to develop optimum properties.

[2] Stock developed fissures, surface cracks and blisters on exposure to test fuel.

EXAMPLE VIII

Where it is desired to have high initial plasticity, a homopolymer of a polymerizable heterocyclic nitrogen base can be included in the putty. An improvement in initial plasticity is realized by including 1 to 75 parts of such a homopolymer per 100 parts of the copolymer including therefor a chemical equivalent of the quaternizing agent. A typical formulation for such a composition is as follows.

| | Parts by weight |
|---|---|
| 70/30 butadiene/2-methyl-5-vinylpyridine copolymer | 100 |
| 2-methyl-5-vinylpyridine homopolymer | 25 |
| Diethyl monobromomalonate | 110 |
| Carbon black | 120 |
| Butyl–8 | 5 |
| Zinc oxide | 5 |
| Sulfur | 3 |
| Stearic acid | 1.5 |

As many possible embodiments may be made of this invention without departing from the scope thereof, it is to be understood that all matter herein set forth is to be interpreted as illustrative and not in a limiting sense.

I claim:

1. A putty comprising a quaternizing agent having an equivalent weight of 150 to 500 and a copolymer of a conjugated diene and a polymerizable heterocyclic nitrogen base containing an active vinylidene group, the reaction with said quaternizing agent forming a fourth nitrogen to carbon bond.

2. The putty of claim 1 in which said polymerizable heterocyclic nitrogen base containing an active vinylidene group is selected from the group consisting of pyridine and quinoline containing a $$CH_2=\overset{R}{\overset{|}{C}}-$$

wherein R is selected from the group consisting of hydrogen and methyl.

3. A putty comprising a quaternizing agent having an equivalent weight in the range of 175 to 500 and a copolymer of a conjugated diene and a polymerizable heterocyclic nitrogen base containing an active vinylidene group, the reaction with said quaternizing agent forming a fourth nitrogen to carbon bond.

4. A putty comprising a quaternizing agent having an equivalent weight of 150 to 500 and a solid copolymer of a conjugated diene and a polymerizable heterocyclic nitrogen base containing an active vinylidene group, the reaction with said quaternizing agent forming a fourth nitrogen to carbon bond.

5. A putty comprising a quaternizing agent having an equivalent weight of 150 to 500 and a liquid copolymer of a conjugated diene and a polymerizable heterocyclic nitrogen base containing an active vinylidene group, the reaction with said quaternizing agent forming a fourth nitrogen to carbon bond.

6. A putty comprising a quaternizing agent having an equivalent weight of 150 to 500, a copolymer of a polymerizable heterocyclic nitrogen base containing an active vinylidene group and a conjugated diene, and a homopolymer of a nitrogen base containing an active vinylidene group, the reaction with said quaternizing agent forming a fourth nitrogen to carbon bond, said putty being curable at a temperature of 25° C.

7. A putty composition comprising a copolymer of a polymerizable heterocyclic nitrogen base containing an active vinylidene group and a conjugated diene; a quaternizing agent having an equivalent weight of 150 to 500, the reaction with said quaternizing agent forming a fourth nitrogen to carbon bond; a filler; a vulcanizing agent; an accelerator; and an accelerator activator.

8. A putty composition comprising a copolymer of a polymerizable heterocyclic nitrogen base containing an active vinylidene group and a conjugated diene; a quaternizing agent having an equivalent weight of 150 to 500, the reaction with said quaternizing agent forming a fourth nitrogen to carbon bond; a filler; a vulcanizing agent; an accelerator; an accelerator activator; and a plasticizer.

9. A putty comprising a quaternizing agent having an equivalent weight of 150 to 500 and a copolymer of a conjugated diene and a polymerizable heterocyclic nitrogen base containing an active vinylidene group, said copolymer having been prepared using a monomer ratio of 2 to 98 parts by weight of said nitrogen base per 100 parts of monomers, the reaction with said quaternizing agent forming a fourth nitrogen to carbon bond.

10. A putty comprising a quaternizing agent having an equivalent weight of 150 to 500 and a polymer of (A) a conjugated diene, (B) a polymerizable heterocyclic base, and (C) at least one compound selected from the group consisting of acrylonitrile, styrene, vinyl chloride, methyl acrylate, methyl methyl methacrylate, vinyl acetate, methyl vinyl ether, and methyl isopropenyl ketone; said polymer having been prepared using a monomer ratio of at least 2 parts by weight of A, at least 2 parts by weight of B, and not over 50 parts by weight of C, based on 100 parts of monomers, the reaction with said quaternizing agent forming a fourth nitrogen to carbon bond.

11. A putty comprising a quaternizing agent having an equivalent weight of 150 to 500 and a copolymer of butadiene and 2-methyl-5-vinylpyridine, the reaction with said quaternizing agent forming a fourth nitrogen to carbon bond.

12. The putty of claim 11 in which said copolymer is prepared using 50 to 75 parts by weight of butadiene per 100 parts of monomers.

13. A putty comprising a quaternizing agent having an equivalent weight of 150 to 500 and a polymer of a conjugated diene, a polymerizable heterocyclic nitrogen base containing an active vinylidene group, and at least one additional polymerizable material containing an active vinylidene group, the reaction with said quaternizing agent formng a fourth nitrogen to carbon bond.

14. The putty of claim 7 in which a vulcanization system comprising dibenzylamine and zinc butyl xanthate is used.

15. Putty comprising a copolymer of a polymerizable heterocyclic nitrogen base containing an active vinylidene group and a conjugated diene; a quaternizing agent having an equivalent weight of 150 to 500, the reaction with said quaternizing agent forming a fourth nitrogen to carbon bond; a filler; a vulcanizing agent; an accelerator; and an accelerator activator; said putty having been cured at a temperature in the range of 25 to 250° C.

16. A putty comprising 40 to 100 parts by weight of diethyl bromomalonate and 100 parts by weight of a copolymer of butadiene and 2-methyl-5-vinylpyridine, the reaction with said diethylbromomalonate forming a fourth nitrogen to carbon bond.

17. A putty comprising 40 to 100 parts by weight of diethyl bromomalonate and 100 parts by weight of a copolymer of butadiene and 2-methyl-5-vinylpyridine, said copolymer having been prepared by polymerizing a mixture containing 50 to 75 parts by weight of butadiene per 100 parts of monomers, the reaction with diethylbromomalonate forming a fourth nitrogen to carbon bond.

18. A putty comprising a copolymer of butadiene and 2-methyl-5-vinylpyridine, a quaternizing agent having an equivalent weight of 150 to 500, the reaction with said quaternizing agent forming a fourth nitrogen to carbon bond, and a vulcanizing agent comprising dibenzylamine and zinc butyl xanthate.

19. A putty comprising a quaternizing agent having an equivalent weight of 150 to 500 and a copolymer of a conjugated diene and 2-methyl-5-vinylpyridine, the reaction with said quaternizing agent forming a fourth nitrogen to carbon bond.

20. A putty comprising a quaternizing agent having an equivalent weight of 150 to 500 and a copolymer of a conjugated diene and 2-vinylpyridine, the reaction with said quaternizing agent forming a fourth nitrogen to carbon bond.

References Cited in the file of this patent

UNITED STATES PATENTS

| | | |
|---|---|---|
| 2,468,159 | Barton | Apr. 26, 1949 |
| 2,484,430 | Sprague et al. | Oct. 11, 1949 |
| 2,617,775 | Newberg et al. | Nov. 11, 1952 |
| 2,619,445 | Kalafus | Nov. 25, 1952 |
| 2,640,042 | Howland et al. | May 26, 1953 |
| 2,848,356 | Pritchard | Aug. 19, 1958 |
| 2,848,442 | Svetlik | Aug. 19, 1958 |

OTHER REFERENCES

L. Ya Ginzburg: C.A. 47, 3600(*d*), 1953.